(12) United States Patent
Pyoun

(10) Patent No.: US 9,170,614 B2
(45) Date of Patent: Oct. 27, 2015

(54) TOUCH INPUT DEVICE

(71) Applicant: Samsung Display Co., Ltd., Yongin, Gyeonggi-do (KR)

(72) Inventor: Joong-Bae Pyoun, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 2 days.

(21) Appl. No.: 13/931,579

(22) Filed: Jun. 28, 2013

(65) Prior Publication Data
US 2014/0218632 A1 Aug. 7, 2014

(30) Foreign Application Priority Data

Feb. 5, 2013 (KR) .................... 10-2013-0012889

(51) Int. Cl.
*G06F 3/033* (2013.01)
*G06F 1/16* (2006.01)
*G06F 3/044* (2006.01)

(52) U.S. Cl.
CPC .............. *G06F 1/1692* (2013.01); *G06F 3/044* (2013.01)

(58) Field of Classification Search
CPC ...... G06F 3/044; G06F 3/03545; G06F 3/016
USPC ..................... 349/12; 345/156, 179, 173–174
See application file for complete search history.

(56) References Cited

U.S. PATENT DOCUMENTS

| 8,648,837 B1* | 2/2014 | Tran et al. ..................... 345/179 |
| 2011/0273399 A1 | 11/2011 | Lee |
| 2013/0162582 A1* | 6/2013 | Hatano et al. ................. 345/173 |

FOREIGN PATENT DOCUMENTS

| KR | 10-2011-0122528 A | 11/2011 |
| KR | 10-1131771 B1 | 3/2012 |
| KR | 10-2012-0038253 A | 4/2012 |

* cited by examiner

*Primary Examiner* — Thanh-Nhan P Nguyen
(74) *Attorney, Agent, or Firm* — Knobbe, Martens, Olson & Bear, LLP

(57) ABSTRACT

A touch input device is disclosed. In one aspect, the device includes a body, a conductive net and an elastic member. The body includes a conductive area with one open end. The conductive net covers a conductive area of the body and intersected with a plurality of conductive lines in a mesh shape. The elastic member is received in the body and supports the conductive net.

7 Claims, 4 Drawing Sheets

TOUCH INPUT DEVICE

CROSS-REFERENCE TO RELATED APPLICATION

This application claims priority to and the benefit of Korean Patent Application No. 10-2013-0012889, filed on Feb. 5, 2013, in the Korean Intellectual Property Office, the entire content of which is incorporated herein by reference.

BACKGROUND

1. Field

The described technology generally relates to a touch input device, and more particularly, to a touch input device of a touch screen panel.

2. Description of the Related Technology

A touch screen panel receives a user's command by selecting instructions displayed on a screen, such as an image display device, or the like, with his/her hand or an object.

To this end, the touch screen panel is generally provided to a front face of the image display device and converts a contact position which is directly contacted with his/her hand or an object into an electrical signal. Therefore, the instruction contents selected at the contact position are recognized as input signals.

For example, the touch screen panel as described above recognizes a touch event generated in a screen area as an input signal by forming sensing electrodes at a display area displaying an image.

Particularly, the capacitive type touch screen panel converts a contact position into a electrical signal, when a conductive sensing electrodes senses a change in capacitance formed other adjacent sensing patterns or ground electrodes, or the like, by contacting with a user's hand or an object.

SUMMARY

One inventive aspect is a touch input device capable of inputting a stable touch with respect to a touch screen panel having a curved surface.

Another aspect is a touch input device which includes: a body including a conductive area with one open end, a conductive net covering a conductive area of the body and intersected with a plurality of conductive lines in a mesh shape, and an elastic member received in the body and supporting the conductive net.

In some examples, the elastic member may be charged with air or oil inside thereof and maintains the elasticity due to the pressure of air or oil.

An oil pressure pump may be further included to control inner pressure of the elastic member.

An iris controlling the size of the conductive area and an iris controller controlling the iris may be further included.

The conductive net may be fixed to one end portion of the body

The conductive net may be electrically connected to a ground part of the body.

The conductive net may be formed of a material having a predetermined conductivity and flexibility.

DETAILED DESCRIPTION

Figure 1:
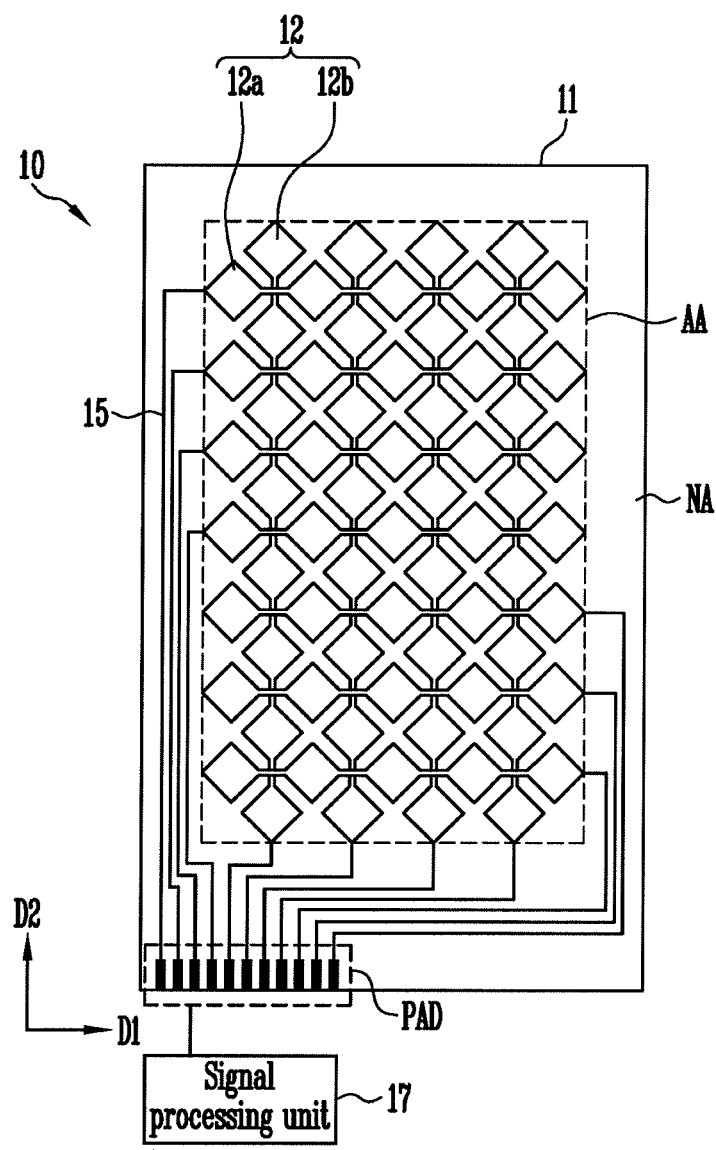
FIG. 1 is a plan view schematically showing an example of a touch screen panel.

Generally, when the touch function of the touch screen panel is inspected or is evaluated, the touch input device may be used for accurate touch input, instead of a human's hand. For example, a conductive bar, one of the touch input device, is a cylindrical shape having about 3 mm to about 6 mm metal material, when the conductive bar is contacted to a surface of the touch screen panel, a touch input is sensed in this manner which is the same as touching with a human's finger.

However, since the conductive bar as described above has a flat contacting surface contacted to the touch screen panel, a contact area of the conductive bar is decreased in a curved area of touch screen panel of a flexible touch screen panel or having a curved window. Therefore, the touch input may not be sensed or be unstable. In addition, in order to adjust a contact area according to a sensing characteristic of the touch screen panel, the conductive bar is needed to be replaced and additional cost may be generated.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, embodiments will be described in detail with reference to the accompanying drawings.

Figure 2A:
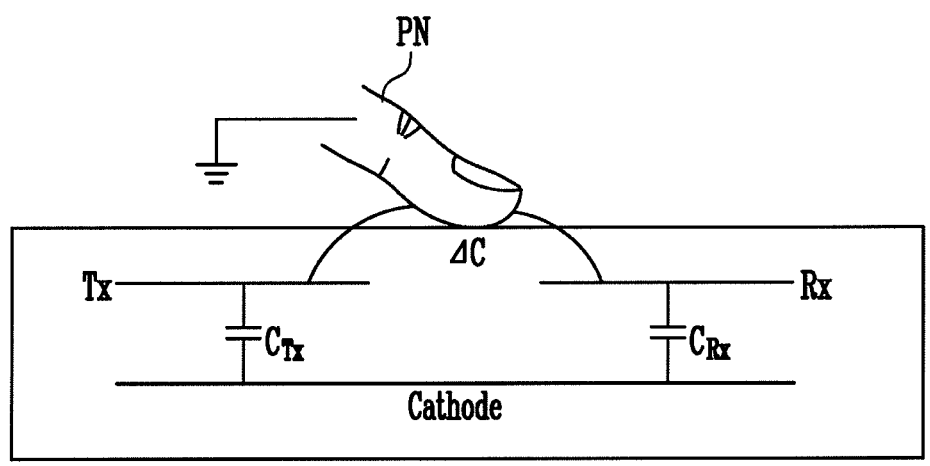
FIGS. 2A and 2B are views for describing a touch input.
Figure 2B:
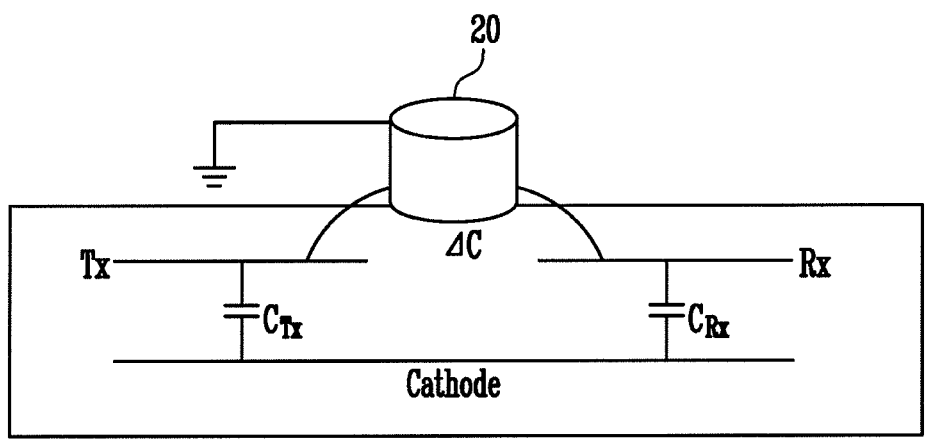

FIG. 1 is a plan view schematically showing an example of a touch screen panel and FIGS. 2A and 2B are views for describing a touch input.

Referring to FIG. 1, the touch screen panel 10 includes: a substrate 11 divided into an active area AA and a non active area NA, sensing electrodes 12 formed on the active area AA of the substrate 11, peripheral wires 15 formed on the non active area NA, and a signal processing unit 17 connected to the sensing electrodes 12 and processing sensing signals.

The substrate 11 may be divided into the active area AA overlapping with an image display region and formed with the sensing electrodes 12 to sense a touch input and the non active area NA positioned on a peripheral portion of the active area AA and formed with the peripheral wires 15.

Here, the substrate has a flexibility and may be implemented with a material having a transparency, high heat resistance, and chemical resistance, and may be a window substrate or a thin film substrate formed of at least one material selected from a group of polyethyleneterephthalate (PET), polycarbonate (PC), Acryl, polymethylmethacrylate (PMMA), triacetylcellulose (TAC), polyethersulfone (PES) and polyimide (PI).

In some embodiment, the sensing electrodes 12 are separately disposed on the active area AA of the substrate 11, and includes first sensing electrodes 12a and second electrodes 12b electrically connected in different directions from each other.

For example, the first sensing electrodes 12a are formed in a first direction D1 and the second electrodes 12b are disposed between the first sensing electrodes 12a and may be connected in a second direction D2 crossing the first direction D1.

In some embodiment, the first sensing electrodes 12a and the second sensing electrodes 12b are alternately disposed and are connected in different directions from each other. For example, the first sensing electrodes 12a may be connected along a column direction (horizontal direction) so as to connect with peripheral wires 15 in a column line unit, and the second sensing electrodes 12b may be connected along a row direction (vertical direction) so as to connect to the peripheral wires 15 in a row line unit. However, the directions D1 and D2 are not necessarily perpendicular to each other as long as they cross each other.

The sensing electrodes 12 may be formed of transparent electrode material, such as indium tin oxide (ITO), so as to transmit light, and after depositing the conductive material on the substrate 11, these are formed by patterning using, for example, a photo resist process. As a method of the touch sensing, a capacitive method, a resistive method, a surface ultrasonic method, an infrared ray method, and the like, are generally used. Among them, the capacitive method, which is mainly used, converts a contact position into an electrical signal by the conductive sensing electrode sensing a change in capacitance formed with other adjacent sensing electrode or a ground electrode, or the like, when a user's hand or object is contacted.

In some embodiments, the first and second sensing electrodes 12a and 12b are formed of the same material, and may be disposed on any one surface of the substrate 11 in a substantially diamond pattern.

However, material, shape, and disposition structure of the sensing electrodes 12 may be variously deformed, but the present invention is not limited thereto.

For example, the first and second sensing electrodes 12a and 12b may be disposed on a different layer from each other in a straight line stripe pattern. The sensing electrodes 12 may also be formed in a metal mesh pattern implemented of fine metal lines rather than transparent conductive material, in still another example, the first and second sensing electrodes 12a and 12b may be formed on both surfaces of the substrate 11 therebetween.

Meanwhile, the peripheral wires 15 allow the first and second sensing electrodes 12a and 12b to respectively connect to an external driving circuit in a line unit along the first and second direction D1 and D2. For example, the peripheral wires 15 are electrically connected to the first and second sensing electrodes 12a and 12b in a column line and a row line unit so as to connect to an external driving circuit, such as a signal processing unit 17 through a pad portion PAD.

In some embodiments, the peripheral wires 15 are disposed on the non active area NA of peripheral side of the touch screen panel rather than the active area AA displaying an image. The peripheral wires 15 may be extended to the pad portion PAD along the second direction D2 which is a vertical line of the touch screen panel from the sensing electrodes 12.

In addition, since the peripheral wires 15 is formed on the non active area NA, there are wide-range material choices, so it may be made of a low resistance metal material, such as molybdenum (Mo), silver (Ag), titanium (Ti), copper (Cu), aluminum (Al), molybdenum-aluminum-molybdenum (Mo/Al/Mo) including transparent electrode material used for forming the sensing electrodes 12.

The signal processing unit 17 checks a change in capacitance of the sensing signal flowing the sensing electrodes 12 and senses the touch input and recognizes the touched position when a conductive body is touched to the touch screen panel 10.

In some embodiments, the touch screen panel 10 is a capacitive type touch screen panel, the first sensing electrodes 12a are a TX electrode transferring the sensing signals, the second sensing electrodes 12b are a RX electrode received the sensing signals.

Referring to FIGS. 2A and 2B, when a human's finger PN or a conductive bar 20 is contacted to the touch screen panel 10, the capacitance formed between the TX electrode and the RX electrode is changed.

The change in capacitance according to the contact position is transferred to the signal processing unit 17, and the contact position is recognized by converting change of the capacitance into the electrical signal.

As described above, when the touch function of the touch screen panel 10 is inspected or is evaluated, the touch input device is mainly used for accurate touch input, instead of a human's hand.

In some embodiments, the conductive bar 20, one of the touch input device, is a cylindrical shape having about 3 mm to about 6 mm metal material, when the conductive bar 20 is contacted to a surface of the touch screen panel 10, a touch input is sensed in this manner which is same as touching with a human's finger.

Figure 3:
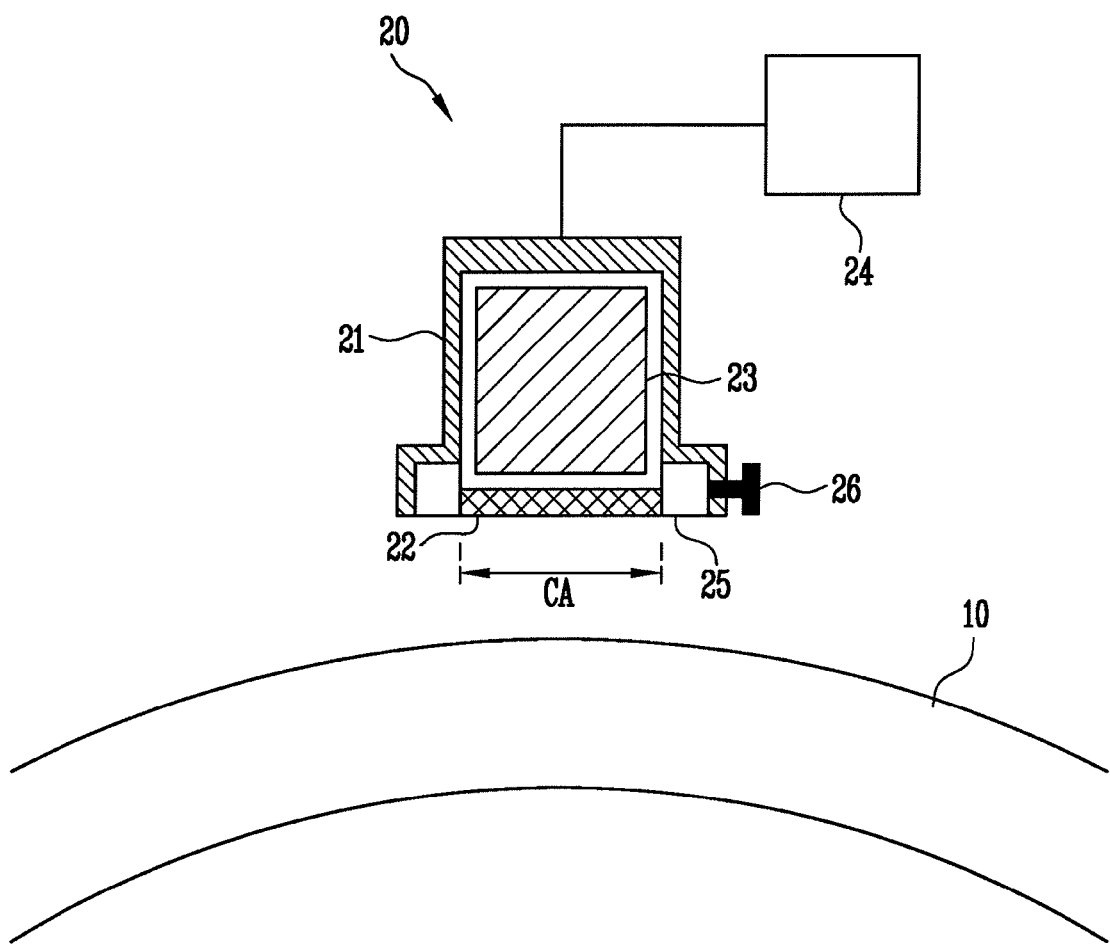
FIG. 3 is a view schematically showing a configuration of a touch input device according to an embodiment.
Figure 4:
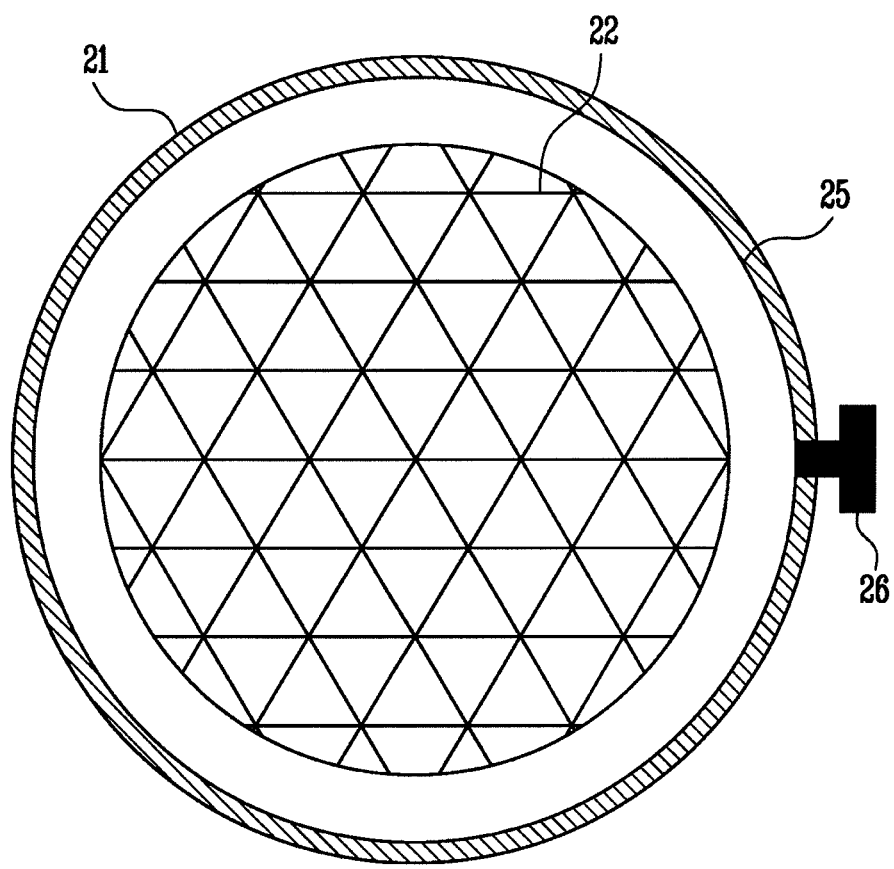
FIG. 4 is a plan view showing one end portion of the touch input device shown in FIG. 3.

FIG. 3 is a view schematically showing a configuration of a touch input device according to an embodiment, FIG. 4 is a plan view showing one end portion of the touch input device shown in FIG. 3.

In some embodiments, the touch input device is the conductive bar 20, it may be some part inspecting the touch function of the touch screen panel 10. When the conductive bar 20 and a mechanical device for moving the conductive bar 20 are used, a touch input may be performed during accurate time on accurate position rather than using human's hand. Therefore, the touch sensing function of the touch screen panel 10, which is an inspection object may be accurately performed.

The touch screen panel 10 may be a bendable flexible touch screen panel or a touch screen panel having a curved window.

Referring FIGS. 3 and 4, the conductive bar 20 may be configured with a body 21, a conductive net 22, an elastic member 23, an oil pressure pump 24, an iris 25 and an iris controller 26.

The body 21 includes a conductive area CA having an opened one end portion. Here, the conductive area CA is an area contacted to the touch screen panel 10.

The body 21 may have a predetermined length and thickness, which is substantially similar to the human's finger, suitable cavity may be included for mounted the conductive net 22, the elastic member 23, the iris 25, or the like, therein. For example, the body 21 may have a substantially circular shape, and it may have various shapes for use.

In some examples, the body 21 may be configured of multiple parts, screws or flange structure are formed on the area where the parts connected to each other, so as to designed a connection and a disconnection The conductive net 22 covers the conductive area CA of the body 21 and has a mesh shape in which multiple conductive lines intersected with each other.

That is, the conductive net 22 substantially entirely covers the opened conductive area CA, and is easily performed shape deformation more than the conductive plate due to an inner space of the body 21 and a fluid characteristic of the conductive net 22.

The conductive net 22 may be configured with metal wires regularly intersected, it may have mixture of a predetermined conductivity and flexibility.

In addition, the conductive net 22 may be fixed to one end of the body 21, and may be electrically connected to a ground part (not shown).

In another example, the conductive net 22 may be fixed to the elastic member 23, rather than the body 21. For example, multiple springs fixed to the other end of the body 21 may be formed in structure which is pulled out peripheral side of the conductive net 22. In this case, degree of shape deformation of the conductive net 22 may be maximized.

The elastic member 23 is received in the body 21 and supports the conductive net 22. The elastic member 23 may include all mechanical configuration having elasticity, and it serves to help a shape deformation and a return to the original shape.

The elastic member 23 may be maintained elasticity, such as a balloon, with charged air or oil inside thereof by the pressure of the air or oil. The oil pressure pump 24 serves to control the pressure of inner side of the elastic member 23. Meanwhile, the iris 25 and the iris controller 26 are a device for controlling the size of the conductive area CA.

The iris 25 may be configured of sectors (not shown) which is in plural to cover the peripheral side of the conductive area CA, and the conductive area CA may be opened and closed by gathering and dispersing of the sectors.

The iris controller 26 is a device for controlling the iris 25, it may control a degree of opening or closing of the iris 25 by rotating a handle included in end portion with user's hand in manual.

In some embodiments, the mesh shape of the conductive net 22 is formed on the conductive area CA contacted to the touch screen panel 10, and the touch input device 20 including the elastic member 23 supporting the conductive net 22 is provided, thereby generating deformation of contact surface the conductive net 22 corresponding to the curved area of the touch screen panel 10, so that the contact area is substantially constantly maintained and making it possible to perform a stable touch input on the curved touch screen panel 10 with the touch input device 20.

In addition, the iris 25 for controlling the size of the conductive area CA and the iris controller 26 controlling the iris 25 are provided, the size of contact area of the touch input device 20 may easily control according to the sensing characteristic of the touch screen panel 10.

As set forth above, the mesh shape of the conductive net is formed on the conductive area contacted to the touch screen panel, and the touch input device including the elastic member supporting the conductive net is provided, thereby generating deformation of contact surface the conductive net corresponding to the curved area of the touch screen panel. As a result, the contact area is substantially constantly maintained and making it possible to perform a stable touch input on the curved touch screen panel with the touch input device.

In addition, the iris for controlling the size of the conductive area and the iris controller controlling the iris are provided, the size of contact area of the touch input device may easily control according to the sensing characteristic of the touch screen panel.

While the above embodiments have been described in connection with the accompanying drawings, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch input device comprising:
    a body including a conductive area with one open end;
    a conductive net covering the conductive area of the body and comprising a plurality of conductive lines in a mesh shape that cross each other; and
    an elastic member included in the body and supporting the conductive net, wherein the elastic member is thicker than the conductive net.

2. The touch input device according to claim 1, further comprising:
    an iris configured to control the size of the conductive area; and
    an iris controller configured to control the iris.

3. The touch input device according to claim 1, wherein the conductive net is fixed to one end portion of the body.

4. The touch input device according to claim 1, wherein the conductive net is electrically connected to a ground part.

5. The touch input device according to claim 1, wherein the conductive net is formed of a material having a predetermined conductivity and flexibility.

6. A touch input device comprising:
    a body including a conductive area with one open end;
    a conductive net covering the conductive area of the body and comprising a plurality of conductive lines in a mesh shape that cross each other; and
    an elastic member included in the body and supporting the conductive net,
    wherein the elastic member contains air or oil inside thereof and maintains the elasticity due to the pressure of air or oil.

7. The touch input device according to claim 6, further comprising an oil pressure pump configured to control inner pressure of the elastic member.

* * * * *